Dec. 16, 1941.  D. B. BAKER ET AL  2,266,582
VEHICLE
Filed Jan. 31, 1940
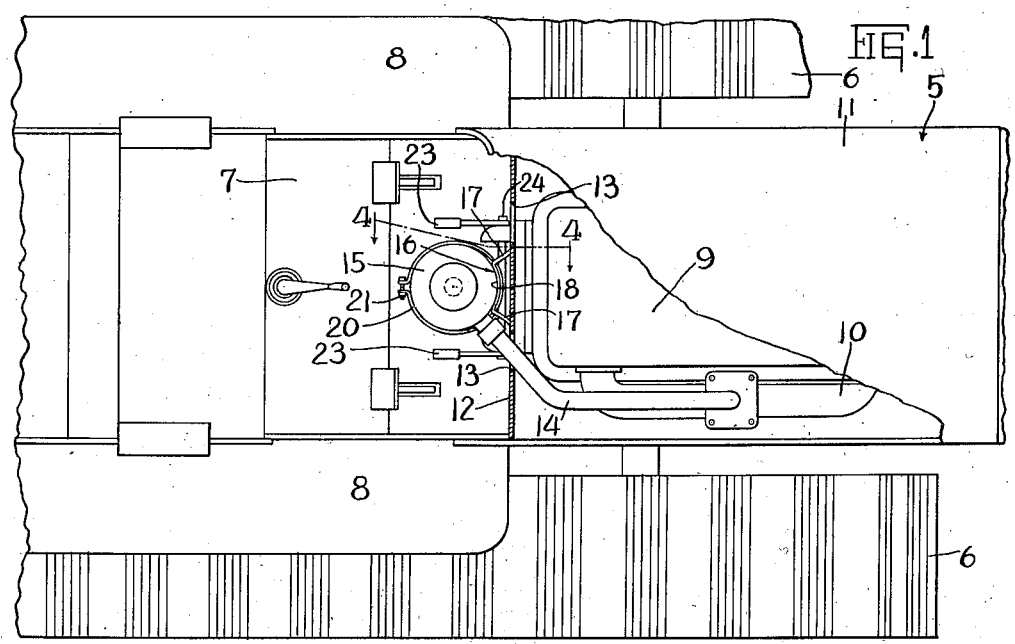
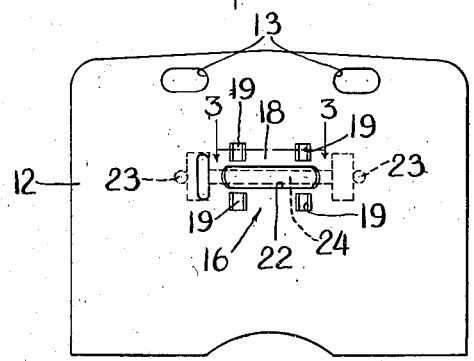
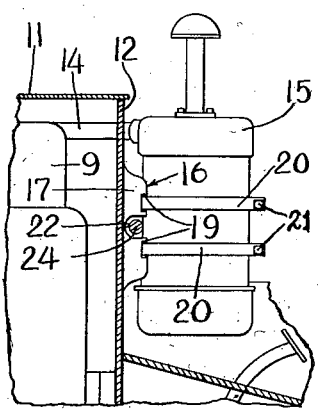
INVENTORS
DAVID B. BAKER
CLIFFORD R. ROGERS
WILLIAM O. BECHMAN
BY
Paul O. Pippel
ATTY.

Patented Dec. 16, 1941

2,266,582

UNITED STATES PATENT OFFICE 2,266,582

VEHICLE

David B. Baker, Riverside, Clifford R. Rogers, Oak Park, and William O. Bechman, Chicago, Ill., assignors to International Harvester Company, a corporation of New Jersey Application January 31, 1940, Serial No. 316,500

7 Claims. (Cl. 180—99)

This invention relates to a vehicle, and more particularly to a dash panel structure therefor.

The invention contemplates and has for its principal object the provision of an improved dash panel structure comprising a sheet-metal plate having a supporting portion for supporting an air cleaner.

Another object is to provide a dash panel and air cleaner arrangement in which the air cleaner is removably supported on the panel.

Another object is the provision of a one-piece sheet-metal panel comprising a supporting portion for an air cleaner and being formed with portions accommodating portions of a control member carried by the panel.

Briefly and specifically, these and other desirable objects are achieved in one preferred form of the invention by the provision of a sheet-metal dash panel adapted to be disposed transversely across a vehicle between a forwardly disposed engine and a rearwardly disposed operator's station. The dash panel includes a supporting portion in the form of a saddle shaped to conform to a surface of a cylindrical air cleaner. The saddle portion includes a pair of apertures for receiving a band which encircles the air cleaner and removably supports said cleaner on the saddle portion. The saddle is further cut out or apertured to accommodate a transverse rock-shaft comprising part of a control member carried by the panel.

A more complete understanding of these and other desirable objects of the invention may be had from the following detailed description taken in conjunction with the accompanying sheet of drawings, in which:

Figure 1 is a plan view of a vehicle showing the disposition of the panel and air cleaner mounting;

Figure 2 is a rear elevational view of the panel, indicating in broken lines the position of a control member;

Figure 3 is an enlarged sectional view taken substantially along the line 3—3 of Figure 2; and, Figure 4 is a sectional view taken on the line 4—4 of Figure 1.

The vehicle chosen of the purpose of illustration is a tractor of the track-laying type comprising generally a body 5 carried on a pair of oppositely disposed track belts 6. The rear portion of the body 5 includes an operator's station 7, comprising a seat and platform delineated respectively at opposite sides by fenders 8 overlying the respective track belts 6. The forward portion of the tractor is provided with the usual power plant or engine 9. The engine is further enclosed with the usual hood structure 11, a portion of which is broken away in Figure 1.

A dash panel 12 is disposed transversely across the body intermediate the engine 9 and the operator's station 7. This panel preferably comprises a sheet-metal plate formed at its upper portion with a pair of spaced openings 13. As best shown in Figure 1, the right-hand opening accommodates a conduit 14 connected between the manifold 10 and the air outlet side of an air cleaner 15. The air cleaner 15 is appropriately supported by the dash panel 12, and for this purpose the panel is provided with an integral support 16 including a pair of transversely spaced rearwardly extending vertical walls 17. The walls are cross-connected by a saddle portion 18 curved to conform to the cylindrical surface of the air cleaner 15. This supporting portion is preferably formed integral with the panel 12. The saddle portion is provided respectively at the junctions between the portions 18 and the walls 17 with two pairs of openings 19. The respective openings of each pair are transversely alined and are adapted to receive bands 20 which encircle the air cleaner 15. The bands are removably connected respectively at their ends by securing means in the form of bolts 21. The particular arrangement permits the bands to be inserted through the openings 19 to engage the imperforate portion of the saddle portion 18. The bands may be readily removed in an obvious manner.

As best shown in Figures 2 and 4, the saddle portion is further cut out or apertured at opposite sides to provide a transverse slot 22. This slot is disposed between the upper and lower openings 19. The dash panel carries a control member including a pair of hand levers 23 and a transverse rock-shaft 24. The control member is suitably carried by the panel, and the rock-shaft 24, as indicated in broken lines in Figure 2, is disposed within the transverse slot 22, lying between the panel 12 and the air cleaner 15. This arrangement is best shown in Figure 4. The control member is suitably connected to regulating devices on the engine, not shown.

As previously mentioned, the air conduit 14 passes through the right-hand opening 13 in the panel 12 and connects the air cleaner 15 with the manifold 10. The left-hand opening 13 is provided for the purpose of accommodating a similar conduit in the event that an engine is utilized having the intake manifold at its left side. This provision accommodates interchangeable power plants consisting of Diesel or gasoline engines. In making such changes, the air cleaner 15 is rotated until the outlet becomes alined with the left-hand opening, whereupon the parts are connected in the manner similar to the arrangement shown in Figure 1.

As best shown in Figures 1 and 4, the improved dash panel structure provides for a compact arrangement of the air cleaner and control member. The saddle portion provides a suitable support for the air cleaner 15, and rigidly supports the same on the panel 12. The provision of the apertures 19 permits ready installation and removal of the encircling bands 20. This feature is especially important in the event that one of such bands becomes broken. Certain other features will be apparent to those skilled in the art.

It will be appreciated that only a preferred embodiment of the invention has been illustrated and described, and that numerous modifications and alterations may be made therein without departing from the spirit and scope of the invention as defined in the appended claims.

What is claimed is:

1. A dash panel for a vehicle in which the vehicle has a body including an air cleaner and a control member having a transverse rock-shaft, said panel comprising a sheet-metal plate adapted to be disposed transversely of the vehicle body and being formed with an outwardly extending saddle portion shaped to conform to the air cleaner, said saddle portion including transversely spaced, alined apertures adapted to receive securing means for securing the cleaner to the panel, said saddle portion being further cut out to accommodate the control member rock-shaft.

2. A dash panel for a vehicle in which said vehicle includes a cylindrical air cleaner, said panel comprising a sheet-metal plate adapted to be disposed transversely across the vehicle and formed with an integral saddle portion, said portion having transversely spaced walls integral with the panel and extending away from the in-plane thereof, said walls being joined by an integral, curved, transverse cross wall shaped to conform to the air cleaner, each wall having an aperture therein adjacent the junction of said wall with the cross wall, said apertures being alined and adapted to receive securing means for securing the cleaner to the panel.

3. In a vehicle having a body including an operator's station, the combination therewith of a sheet-metal dash panel arranged transversely across the body forwardly of the operator's station, said panel including at its face toward the operator's station a rearwardly extending support having transversely spaced, vertical walls, each of said walls being formed with an aperture, said apertures being alined, an air cleaner carried by the support, and securing means engaged between the cleaner and the apertured walls for securing the cleaner to the panel.

4. In a vehicle having a body including an operator's station, the combination therewith of a sheet-metal dash panel arranged transversely across the body forwardly of the operator's station, said panel including a rearwardly extending support having transversely spaced, vertical walls, each of said walls being formed with an aperture, said apertures being alined, an air cleaner carried by the support, and securing means comprising a removable band encircling the cleaner and passing through the apertured walls and having its opposite ends secured together for securing the cleaner to the panel.

5. In a vehicle having a body including an operator's station, the combination therewith of a transversely disposed dash panel arranged ahead of the operator's station, said panel comprising a one-piece sheet-metal plate having an integral, rearwardly extending support, said support having a forwardly curved saddle portion, a cylindrical air cleaner carried by the support and fitting the saddle portion, said saddle portion being formed with transversely spaced apertures alined transversely on an arc concentric with the air cleaner, and a circular band encircling the cleaner and passing through said apertures and having its opposite ends secured together for securing said cleaner to the panel.

6. In a vehicle having a body including a forwardly disposed engine and a rearwardly disposed operator's station, the combination therewith of a transverse dash panel carried on the body intermediate the engine and the operator's station, said panel including a rearwardly extending support comprising rearwardly extending, transversely spaced vertical walls, and a cross wall forming a saddle portion, each of the first walls having a pair of vertically spaced apertures therein, said apertures being respectively transversely alined, an air cleaner carried by the support and fitting the saddle portion, a removable band encircling the cleaner and passing through two of the alined openings for securing the cleaner to the panel, and a control member carried on the panel and including a rock-shaft passing through the other two apertures between the cleaner and the panel.

7. In a vehicle having a body including a forwardly disposed engine and a rearwardly disposed operator's station, the combination therewith of a transverse dash panel carried on the body intermediate the engine and the operator's station, said panel including a rearwardly extending support comprising rearwardly extending, transversely spaced vertical walls, and a cross wall forming a saddle portion, each of the first walls having an aperture therein, said apertures being alined transversely, said saddle portion and each of the first walls being cut out to form a transverse slot, an air cleaner carried by the support and fitting the saddle portion, a band encircling the cleaner and passing through the apertures for securing the cleaner to the panel, and a control member carried by the panel and including a transverse rock-shaft disposed between the cleaner and the panel and passing within the aforesaid transverse slot.

DAVID B. BAKER.
CLIFFORD R. ROGERS.
WILLIAM O. BECHMAN.